(No Model.)

E. NELSON.
APPARATUS FOR FILLING RUBBER MOLDS.

No. 254,498. Patented Mar. 7, 1882.

WITNESSES.
DE L. H. Barclay
W. A. Bertram

INVENTOR
Edward Nelson.

By
N. D. Williams
ATTORNEY.

UNITED STATES PATENT OFFICE.

EDWARD NELSON, OF FREDERICK, MARYLAND.

APPARATUS FOR FILLING RUBBER-MOLDS.

SPECIFICATION forming part of Letters Patent No. 254,498, dated March 7, 1882.

Application filed August 31, 1881. (No model.)

*To all whom it may concern:*

Be it known that I, EDWARD NELSON, of the city and county of Frederick, State of Maryland, have invented certain new and useful Improvements in Apparatus for Filling Rubber-Molds; and I hereby declare the same to be fully, clearly, and exactly described as follows, reference being had to the accompanying drawings, in which—

Figure 1:
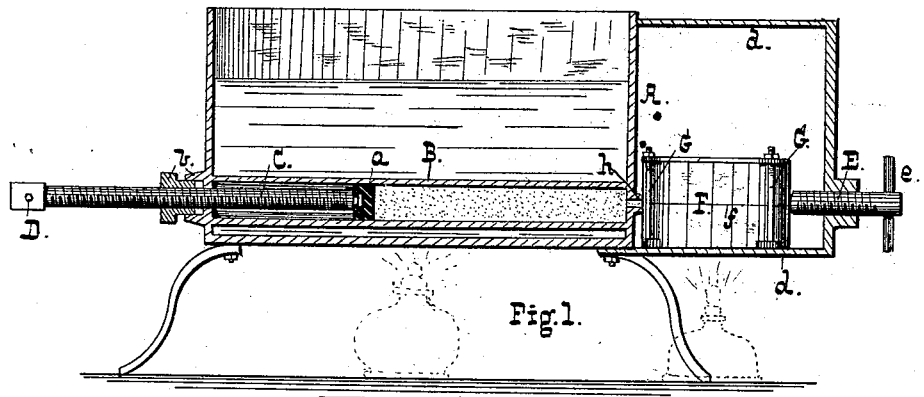
Figure 2:
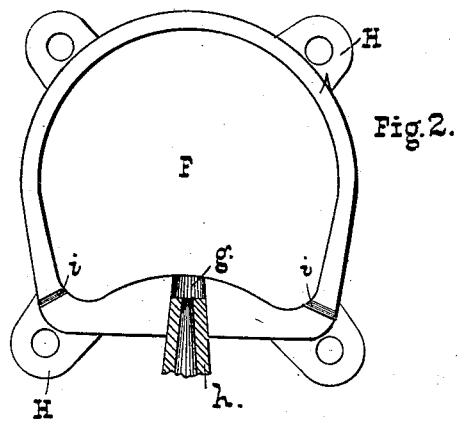

Figure 1 is a central vertical sectional view, partly in elevation, of the device; and Fig. 2 is a plan of one-half of the mold.

My invention relates to apparatus for filling molds with rubber preparatory to vulcanization; and it has for its object to secure a more perfect entrance of the rubber into minute interstices of the mold and obviate in a great measure the cost and trouble of the finishing processes subsequent to vulcanization.

The invention will first be described, and then pointed out in the claim.

In the drawings, A is a suitable tank, mounted upon legs of a length to support it at a convenient distance above the table and admit of a lamp being placed under the tank; and B is a hollow cylinder passing through the tank, and provided with a piston, $a$, which may be driven forward or backward by means of a screw-rod, C, passing through a stuffing-box, $b$, in the end of the tank. The end of the rod has a crank or a perforation, D, for the insertion of a suitable lever. In the opposite end of the tank is a tapering nozzle, $h$, communicating with the interior of the cylinder B.

F is the mold or flask, made in two parts, which meet on the line $f$, and which are clamped together by means of screw-rods G, that pass through perforated lugs H in the cover and base of the mold.

A tapering opening, $g$, is provided, adapted to fit tightly upon the nozzle $h$, and one or more vents, $i$, are located near the side of the mold having the inlet-opening. A bracket, $d$, is attached to the end of the tank, and through its side passes a screw-rod, E, having a lever, $e$, whereby the flask may be pressed tightly against the nozzle $h$, as shown.

In operation the mold is prepared in the usual way, and being tightly closed is pressed against the nozzle. The cylinder B is previously charged with prepared-rubber, and water is placed in the tank. Heat is applied to the water and also to the mold by means of suitable lamps or gas-jets, whereby the prepared rubber contained within the cylinder is reduced to a pasty or viscid consistency. The screw C is then turned, driving the piston forward and causing the rubber to flow from the nozzle $h$ and into the mold. The air escapes from the orifices $i$ in the latter, and finally, as the mold is completely filled, the viscid rubber appears there also. The object of locating the openings $i$ in the side of the mold through which the rubber is injected is to insure the complete filling of the mold and exclusion of air. The viscid rubber flows first to the side of the mold opposite the opening $g$, and the corners in which the openings $i$ are located are the last parts to be filled, so that the appearance of the rubber at the openings is a certain indication that the mold is properly filled. The flask is finally removed and its contents are vulcanized.

The effect of the method described in the manufacture of dental plates is to produce a vastly superior article, as the viscid rubber in being forced into the mold completely drives out the air and flows closely around the teeth-pins and into every line and crevice of the mold. The causes which conduce to this effect are of course active in producing analogous results in the manufacture of other rubber articles.

The apparatus is simple and inexpensive, and the conventional flask or mold may be readily adapted to it.

I would have it understood that I do not limit myself to the precise details of construction, as they may be varied in many ways without departing from the spirit of my invention.

What I claim is—

In combination with the mold having a tapering opening, the tank provided with the cylinder B, having conical nozzle, the forcing mechanism, and the clamping-screw E, as set forth.

Witness my hand this 26th day of August, 1881.

EDWARD NELSON.

Witnesses:
R. H. LAWRENCE,
R. D. WILLIAMS.